(12) United States Patent
Lopes

(10) Patent No.: US 6,672,096 B2
(45) Date of Patent: Jan. 6, 2004

(54) VACUUM-BREAKING VALVE FOR REFRIGERATION APPLIANCES

(75) Inventor: Luiz Antonio Diemer Lopes, Joinville (BR)

(73) Assignee: Multibras S.A. Electrodomesticos, Sao Paulo (BR)

( * ) Notice: Subject to any disclaimer, the term of this patent is extended or adjusted under 35 U.S.C. 154(b) by 0 days.

(21) Appl. No.: 10/239,005

(22) PCT Filed: Apr. 18, 2001

(86) PCT No.: PCT/BR01/00051
§ 371 (c)(1),
(2), (4) Date: Dec. 23, 2002

(87) PCT Pub. No.: WO01/81844
PCT Pub. Date: Nov. 1, 2001

(65) Prior Publication Data
US 2003/0111621 A1 Jun. 19, 2003

(30) Foreign Application Priority Data
Apr. 20, 2000 (BR) .............................................. 0001249

(51) Int. Cl.$^7$ ............................................... F25D 15/00
(52) U.S. Cl. ............................... 62/331; 62/80; 62/409; 137/218; 137/334
(58) Field of Search .......................... 62/331, 409, 410; 137/217, 218, 334

(56) References Cited

U.S. PATENT DOCUMENTS

| | | | |
|---|---|---|---|
| 2,741,897 A | 4/1956 | Riggins et al. ................. | 62/89 |
| 3,167,931 A | 2/1965 | Bryson ......................... | 62/273 |
| 3,696,632 A | * 10/1972 | Carlin et al. ................... | 62/285 |
| 3,813,896 A | 6/1974 | Lebahn ......................... | 62/409 |
| 5,254,120 A | * 10/1993 | Cinberg et al. ............. | 606/109 |
| 5,271,240 A | * 12/1993 | Detrick et al. ................. | 62/268 |
| 5,466,239 A | * 11/1995 | Cinberg et al. ............. | 606/109 |
| 5,499,514 A | * 3/1996 | Ho ............................... | 62/291 |
| 5,836,170 A | * 11/1998 | Perkins et al. ................ | 62/409 |
| 6,176,776 B1 | * 1/2001 | Finkelstein et al. ......... | 454/195 |

FOREIGN PATENT DOCUMENTS

| | | | |
|---|---|---|---|
| DE | 31 51 940 | 7/1983 | ............ F24F/13/14 |
| DE | 92 16 542 | 2/1993 | ............ F25D/11/00 |
| EP | 0 030 046 | 6/1981 | ............ F25D/17/04 |
| FR | 2391435 | * 12/1979 | |

* cited by examiner

Primary Examiner—William E. Tapolcai
Assistant Examiner—Mohammad M. Ali
(74) Attorney, Agent, or Firm—Darby & Darby

(57) ABSTRACT

A vacuum-breaking valve for refrigeration appliances, comprising: a tubular body (10) made of a thermally conductive material and mounted through one of the walls of a cabinet (G) of the refrigeration appliance; a valve seat (30) mounted to the tubular body (10); a sealing means (40) constantly biased towards a closed position, in which it is seated on said valve seat (30), and movable towards an open position when the pressure inside cabinet (G) is lower than the pressure outside said cabinet (G); and a heat collector (20) provided with a thermal radiation collecting surface (21) mounted to the tubular body (10) and facing a heat source external to cabinet (G).

12 Claims, 1 Drawing Sheet

VACUUM-BREAKING VALVE FOR REFRIGERATION APPLIANCES

FIELD OF THE INVENTION

The present invention refers to a construction of a vacuum-breaking valve to be used in refrigeration appliances in general, such as refrigerators and freezers, in order to increase the internal pressure inside these appliances.

BACKGROUND OF THE INVENTION

In refrigeration appliances, such as refrigerators and freezers which have, inside a cabinet G, at least one hermetically closed and thermally insulated compartment, inside which the temperature is lower than the temperature of the surrounding external environment, there is observed an undesired effect which tends to make difficult the opening of the door of said refrigeration appliance under certain circumstances.

This phenomenon is due to the decrease in the pressure of the air mass inside the refrigerated compartment, which is inherent to the decrease in temperature, producing a difference between the internal pressure, which is lower, and the external pressure, which is higher, mainly after the opening of the door and the subsequent closing thereof.

As a result, a force is produced on the door of the appliance acting to keep it closed and consequently making it difficult to open.

In order to overcome this problem and allow the users to open the door of the compartment of the refrigeration appliance with less effort, a device known as vacuum-breaking valve is used, whose function is to promote the equalization of the internal and external pressures. This valve is comprised, as illustrated in FIGS. 1 and 2 of the appended drawing, by a plastic piece in the form of a generally cylindrical and rectilinear tube 1, which crosses one of the walls of the cabinet G of the refrigeration appliance, in order to promote a fluid communication between the inside and the outside thereof and to allow, in certain occasions (notably when the internal pressure is lower than the external pressure), the external air to enter the refrigeration appliance, thus increasing the internal pressure until it becomes close to the external pressure of said refrigeration appliance. This tube 1 is open on its inner side and has on its outer side a sealing system consisting of a movable sphere 2, which is activated by gravity and is movable between a sealing position when inoperative, seated on a valve seat 3 of circular contour and sealing the air passage, and a spaced position when maintained suspended in a vertical portion of the tube 1, due to the difference between the external and internal pressures of cabinet G, thus liberating the air flow to the inside of said cabinet.

While reducing the effort required for opening the door, this solution usually allows, when air flows from the outside to the inside of the refrigeration appliance, the penetration of humidity (water vapor) dissolved in the air, which will freeze upon meeting the low temperatures inside the refrigeration appliance and which may obstruct the inner opening of the valve and impair its proper operation. To overcome this problem, the tubular body of the valve should be heated in order to prevent that the humidity coming from the outside freezes on the valve itself.

In a known solution, this heating is provided by an electric resistor (conducting wire, not illustrated) wound around the tubular body of the valve and which dissipates heat when subject to an electric current, promoting the desired heating of said valve. However, it has been observed that this solution, besides being expensive, since it increases the energetic consumption of the refrigeration appliance, may damage the valve body, which is usually in plastic material.

DISCLOSURE OF THE INVENTION

Thus, it is an object of the present invention to provide a vacuum-breaking valve, which reduces the effort required from the user to open the door of the refrigeration appliance, without the drawback of allowing the condensation of the humidity contained in the air that enters the valve, particularly in its inner end, and without modifying the energetic consumption of said refrigeration appliance.

A further objective of the present invention is to provide a vacuum-breaking valve, which is easy to obtain and mount in the refrigeration appliance. These and other objectives are achieved by a vacuum-breaking valve for refrigeration appliances including a cabinet closed by a respective door and refrigerated by a refrigeration system provided with a compressor, said valve comprising: a tubular body made of a thermally conductive material and mounted through one of the walls of the cabinet, in order to present an inner end, which is open to the inside of the cabinet, and an outer end, which is open to the outside of the cabinet; a valve seat mounted to the tubular body, in order to define a fluid communication between the inside and the outside of the cabinet; a sealing means mounted to the tubular body and which is constantly biased towards a closed position, in which it is seated on said valve seat, blocking the fluid communication between the inside and the outside said cabinet, and movable towards an open position, spaced from the valve seat and which is achieved when the pressure inside the cabinet is lower than the pressure outside said cabinet; and a heat collector, provided with a thermal radiation collecting surface and mounted around the tubular body adjacent to its outer end, so that said surface faces a heat source external to the cabinet.

BRIEF DESCRIPTION OF THE DRAWINGS

The invention will be described below, with reference to the appended drawing, in which.

BEST MODE OF CARRYING OUT THE INVENTION

Figure 1:
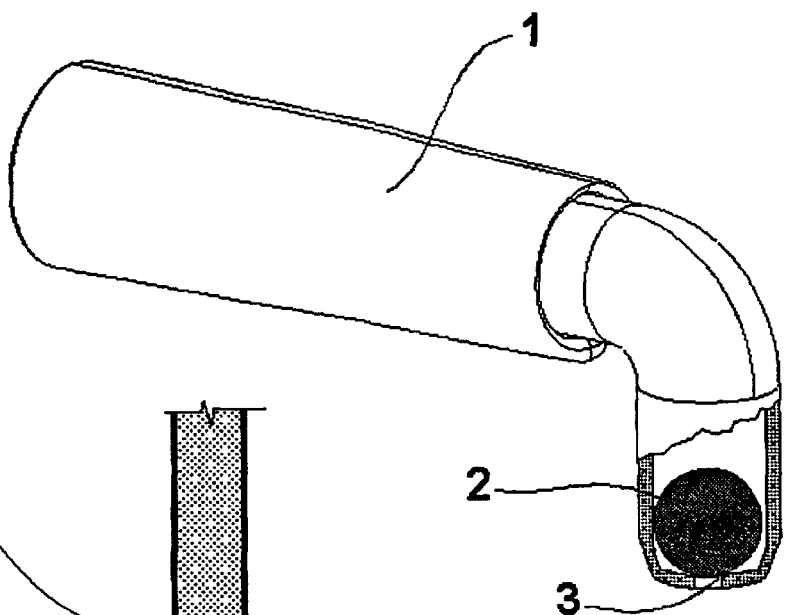
FIG. 1 is a schematic and perspective view of the vacuum-breaking valve of the prior art.
Figure 2:
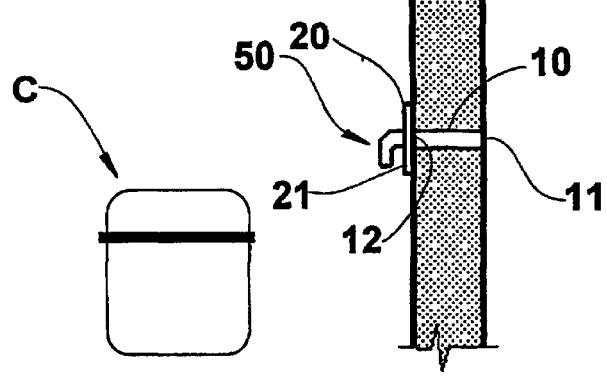
FIG. 2 is a schematic and longitudinal cross-sectional partial view of a wall portion of a refrigeration appliance including a possible construction for the vacuum-breaking valve of the present invention.
Figure 3:
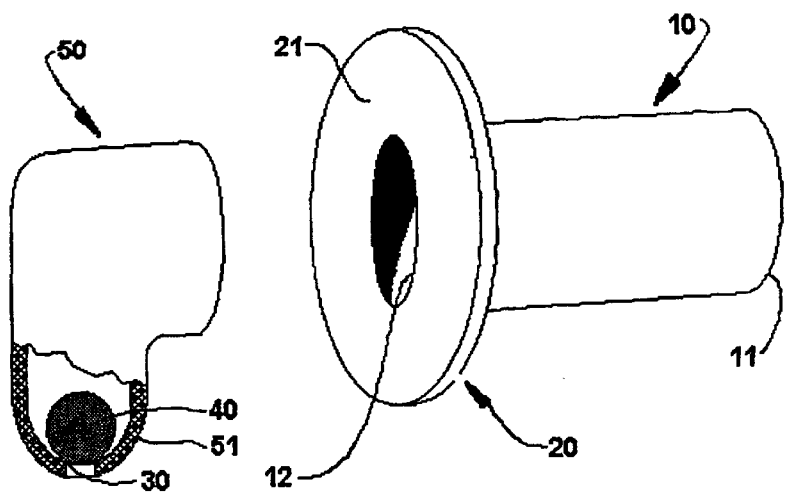
FIG. 3 is a schematic and perspective view of the construction for the vacuum-breaking valve of the present invention illustrated in FIG. 2.

The vacuum-breaking valve of the present invention adjusts the admission of ambient air into a cabinet G of a refrigeration appliance when the pressure in its interior is lower than the pressure on the outside, said cabinet G, which is usually parallelepipedic, being closed by a respective door, not illustrated, and refrigerated by a refrigeration system provided with a compressor C.

According to the present invention, the present vacuum-breaking valve comprises a tubular body 10 of thermally conductive material, for example a metallic material, mounted through one of the walls of the cabinet G, and a heat collector 20 mounted around the tubular body 10, so that a thermal radiation collecting surface 21 faces a heat source external to the cabinet G. The vacuum-breaking valve of the solution being described is mounted onto a rear wall of the cabinet G, for example, adjacent to the compressor C.

The vacuum-breaking valve of the present invention further comprises a valve seat 30 mounted to the tubular body 10, in order to establish a fluid communication between the inside and the outside of cabinet G and a sealing means 40, which is mounted to the tubular body 10 and which is constantly and gravitationally biased towards a closed position, in which it is seated on said valve seat 30, blocking the fluid communication between the inside and the outside of the cabinet G, and being movable towards an open position, spaced from the valve seat 30 and achieved when the pressure inside cabinet G is lower than the pressure outside said cabinet G.

The tubular body 10 has an inner end 11, which is open to the inside of cabinet G and an outer end 12, which is open to the outside of said cabinet G having a front portion 50, for example "L" profiled, inferiorly defining the valve seat 30 and inside which the sealing means 40 is mounted.

In a way of carrying out the present invention, the tubular body incorporates the front portion 50.

In the illustrated embodiment, the sealing means 40 is a substantially spherical body floating inside the front portion 50. The valve seat 30 illustrated is defined by a narrowing of a lower end 51 of the front portion 50.

According to the present invention, the heat collector 20 has a surface to be seated against the wall of cabinet G to which it is mounted, said surface being adjacent to the outer end 12 of the tubular body 10 and opposite to the thermal radiation collecting surface 21, so that the latter faces the heat source external to cabinet G.

In a solution of the present invention, the vacuum-breaking valve is mounted to the cabinet G, so that the heat collector 20 has its thermal radiation collecting surface 21 facing the compressor C, in order to receive the heat produced by the operation thereof.

According to the present invention, the thermal radiation collecting surface 21 should be suitably shaped for an improved collection of the thermal radiation produced by the heat source, said shape being defined, for example, by one of the flat or concave surfaces, such as a parabolic surface.

According to the illustrations, the heat collector 20 is flat and in the form of a flange, for example annular and having its thermal radiation collecting surface 21 provided with a thermally absorbent layer, for example in the form of a film of paint.

In one way of carrying out the present invention, not illustrated, the heat collector 20 is in the form of a flange extending from the outer end of the tubular body 10.

In another way of carrying out the present invention, said flange is annular and provided concentrically or excentrically on the tubular body 10.

In one way of carrying out the present invention, the vacuum-breaking valve is mounted in cabinet G adjacent to the compressor C, for example behind it, in order to have its thermal radiation collecting surface 21 radially aligned in relation to the heat radiation produced by the compressor C.

With the solution of the present invention, the heat absorbed from the environment external to cabinet G by the heat collector 20 is transmitted to the tubular body 10 up to the regions in which there is the possibility of ice formation on said tubular body, avoiding said formation, without however interfering with the heat balance inside cabinet G. Since the air admitted for pressure balance by the vacuum-breaking valve of the present invention is heated, the condensation of the humidity on the tubular body 10 and the consequent ice formation thereon are avoided. The heat collected this way is transmitted through the metallic body, reaching the entire valve and promoting the heating thereof.

What is claimed is:

1. A vacuum-breaking valve for refrigeration appliances having a cabinet (G) closed by a respective door and refrigerated by a refrigeration system provided with a compressor (C), characterized in that it comprises:

a tubular body (10) made of a thermally conductive material and mounted through one of the walls of the cabinet (G), in order to present an inner end (11), which is open to the inside of cabinet (G), and an outer end, (12), which is open to the outside of cabinet (G);

a valve seat (30) mounted to the tubular body (10), in order to define a fluid communication between the inside and the outside of cabinet (G);

a sealing means (40) mounted to the tubular body (10) and constantly biased towards a closed position, in which it is seated on said valve seat (30), blocking the fluid communication between the inside and the outside of cabinet (G), and movable towards an open position, spaced from the valve seat (30) and which is achieved when the pressure inside cabinet (G) is lower than the pressure outside said cabinet (G); and a heat collector (20) provided with a thermal radiation collecting surface (21) and mounted around the tubular body (10) adjacent to its outer end (12), so that said surface faces a heat source external to the cabinet (G).

2. Valve, according to claim 1, characterized in that the heat collector (20) has its thermal radiation collecting surface (21) facing the compressor (C).

3. Valve, according to claim 2, characterized in that the heat collector (20) has its thermal radiation collecting surface (21) defined by one of the flat or concave surfaces.

4. Valve, according to claim 3, characterized in that the heat collector (20) has the shape of a flange extending from the outer end (12) of the tubular body (10).

5. Valve, according to claim 4, characterized in that the heat collector (20) has the shape of an annular flange mounted around the tubular body (10).

6. Valve, according to claim 5, characterized in that the annular flange is concentric with the tubular body (10).

7. Valve, according to claim 1, characterized in that the heat collector (20) has a surface to be seated against said cabinet wall, opposite to its thermal radiation collecting surface (21).

8. Valve, according to claim 1, characterized in that the tubular body (10) carries a front portion (50) inferiorly defining the valve seat (20) and inside which the sealing means (40) is mounted.

9. Valve, according to claim 8, characterized in that the tubular body (10) is metallic and incorporates the front portion (50).

10. Valve, according to claim 1, characterized in that the thermal radiation collecting surface (21) is provided with a thermally absorbent layer.

11. Valve, according to claim 1, characterized in that the sealing means (40) is a body floating inside the front portion (50) and being constantly and gravitationally biased towards its closed position.

12. Valve, according to claim 11, characterized in that the sealing means (40) is a substantially spherical body, with the valve seat (30) being defined by a narrowing of a lower end (51) of the front portion (50).

* * * * *

UNITED STATES PATENT AND TRADEMARK OFFICE
CERTIFICATE OF CORRECTION

PATENT NO.    : 6,672,096 B2  
DATED         : January 6, 2004  
INVENTOR(S)   : Luiz Antonio Diemer Lopes It is certified that error appears in the above-identified patent and that said Letters Patent is hereby corrected as shown below:

<u>Title page,</u>  
Item [73], Assignee, please delete "Multibras S.A. Electrodomesticos" and substitute -- Multibras S.A. Eletrodomesticos --.

Signed and Sealed this

Thirtieth Day of March, 2004

JON W. DUDAS  
*Acting Director of the United States Patent and Trademark Office*